Dec. 8, 1970  G. A. VAN RIEMSDIJK  3,546,535
TRANSFORMERS AND COMPOSITE TAP CHANGERS ASSOCIATED THEREWITH
Filed Oct. 2, 1968
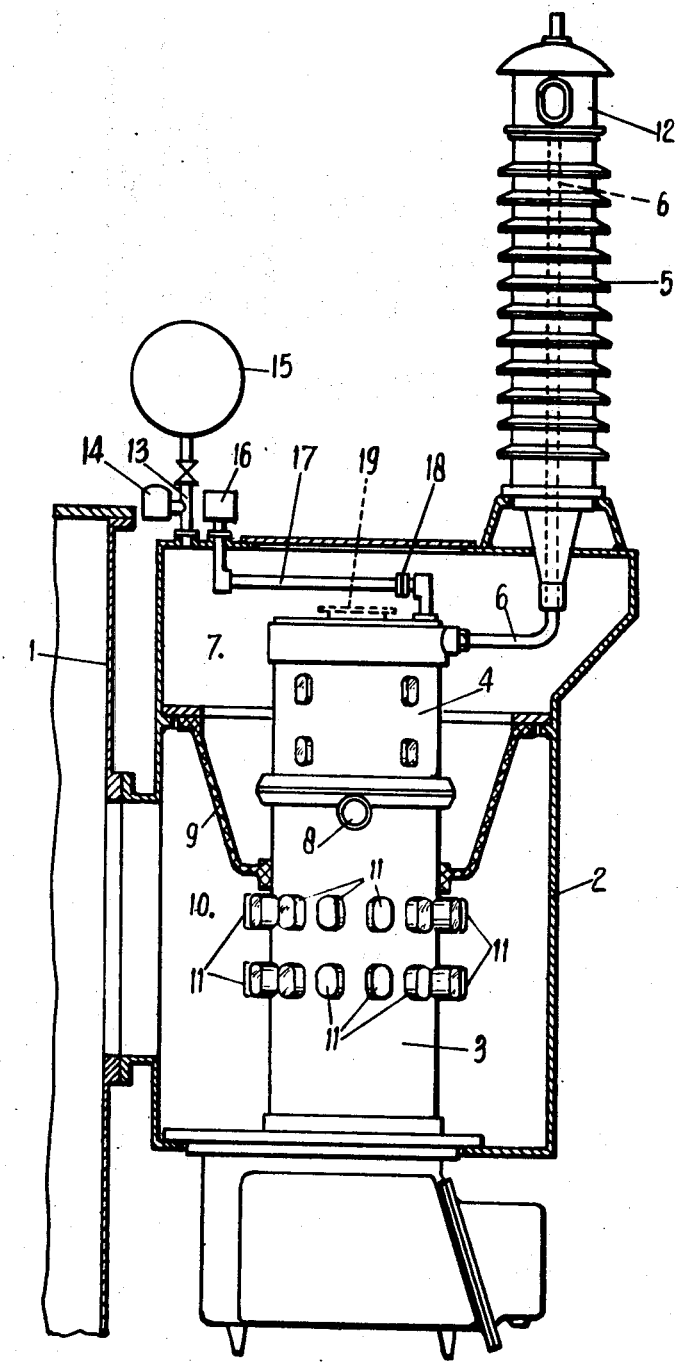
INVENTOR
GERARDUS A. VAN RIEMSDIJK
BY Imirie & Smiley
ATTORNEYS United States Patent Office 3,546,535
Patented Dec. 8, 1970

3,546,535
TRANSFORMERS AND COMPOSITE TAP
CHANGERS ASSOCIATED THEREWITH
Gerardus A. van Riemsdijk, Nijmegen, Netherlands, assignor to Smit Nijmegen Electrotechnische Fabrieken N.V., Nijmegen, Netherlands, a company of the Netherlands
Filed Oct. 2, 1968, Ser. No. 764,386
Claims priority, application Netherlands, Oct. 10, 1967, 6713730
Int. Cl. H01f 27/40
U.S. Cl. 317—14                                    2 Claims

ABSTRACT OF THE DISCLOSURE

A transformer and a composite tap changer with a selector switching unit housed in adjacent metal vessels. The vessels are filled with insulating liquid and form a common metal envelope to be connected to earth. Provided in the vessel containing the tap changer is an inner container substantially made of insulating material, and being divided into compartments. One of the compartments contains the selector switching unit and the other compartment contains the change-over switching unit. The compartments are separated from one another and from the transformer vessel in a liquid tight manner and are filled with insulating liquid.

---

The invention relates to a transformer and a composite tap changer associated with said transformer and comprising a selector switching unit operating under zero-load conditions and a change-over switching unit operating under load conditions. Said selector switching unit may consist of a selector switch for the coarse voltage steps only, or of the combination of such a selector switch for the coarse voltage steps and a selector switch for the fine voltage steps or of a selector switch for the fine voltage steps only, whereas the change-over switching unit then consists of a change-over switch, which is adapted to select the fine voltage steps at the same time, or of nothing else than a change-over switch, respectively.

Transformers and tap changers associated there-with of this kind are known, in which the transformer and the tap changer are accommodated in adjacent metal vessels filled with insulating liquid and forming a common envelope to be connected with earth and in which the selector switching unit and the change-over switching unit are contained in compartments of an inner container substantially made of insulating material and provided in the tap changer vessel, said compartments being also filled with insulating liquid and separated from one another and from the transformer vessel in a liquid tight manner, said inner container being spaced at its end bounding the change-over switching unit compartment from the near end wall of the tap changer vessel by an end compartment, which is also filled with insulating liquid and is in open communication with the selector switching unit compartment, and said end compartment being connected to a conduit provided with a gas relay for protection against a too strong evolution of gas in said end compartment and said selector switching unit compartment.

The invention has the object to so modify the known combination of transformer and tap changer, the latter being up to now generally connected on the star point side of the transformer, as to allow the tap changer to be readily connected to the network side of the transformer and to obtain other advantages. The object aimed at is achieved in that the said end compartment extends also radially alongside the compartment containing the change-over switching unit. A first advantage of this construction is that, if the compartment containing the change-over switching unit operating under load conditions should explode, the flying fragments thereof cannot get into the transformer vessel. An other advantage is that all compartments inside the tap changer vessel can be readily protected. In addition the specially constructed lead-in bushing insulator which up to now had to be used for tap changers connetced to the network side of the transformer can be replaced by a cheap and simple bushing insulator to lead in the network phase line.

A simple construction is possible when the said end compartment is so formed as to extend also radially alongside a part of the selector switching unit compartment and terminal members for the connection of the tap changer with the tappings of the transformer windings are only provided on the wall of the part of the selector switching unit compartment, which projects from said end compartment into the tap changer vessel. In that case the end compartment may directly communicate with said selector switching unit compartment through an aperture made in the wall of the part of the latter compartment which projects into the end compartment. No conduits of insulating material are then necessary to interconnect the end compartment and the selectors switching unit compartment of the inner container. Moreover, the connections between the transformer tappings and the terminal members of the tap changer then need not be passed through partition walls, so that they are easily made.

The invention will be elucidated with the aid of the drawing. This drawing shows partly a vertical sectional view partly an elevational view of a vessel attached to a transformer vessel and containing a composite tap changer.

In the drawing 1 is the vessel of a regulating transformer (not shown), whereas 2 is the vessel attached to the vessel 1 and containing a tap changer (not shown either). The vessels 1 and 2 form together a common metal envelope to be connected with earth for the transformer and the tap changer.

The tap changer consists of a part, the selector switching unit, operating under zero-load conditions and a part, the change-over switching unit, operating under load conditions. The selector switching unit may consist of a selector switch for the fine voltage steps, or of a selector switch for one or more coarse voltage steps, or of the combination of these selector switches, whereas the change-over switching unit may be formed as an individual throw-over switch or a combination of throw-over switch and selector switch for the fine voltage steps. The selector switching unit is accommodated in a compartment 3 and the change-over switching unit is mounted in a compartment 4 of an inner container which is placed in the tap changer vessel 2 and is made for its major part of insulating material. The compartments 3 and 4 are separated from one another and from the transformer vessel 1 in a liquid tight manner.

In the present case the tap changer is connected between the tappings of the transformer winding and the relevant network phase line, which is connected with the change-over switching unit contained in the compartment 4 by a tubular conductor 6 which extends through a bushing insulator 5.

In the embodiment constructed in accordance with the invention the compartment 4 is surrounded by a space 7 which is in open communication with the compartment 3 containing the selector switching unit through an aperture 8. This compartment 7 is separated in a liquid tight manner by an insulating partition wall 9 from a second space 10 of the tap changer vessel 2. The compartment 10 surrounds a part of the compartment 3, that is to say the part, the wall of which carries the terminal members 11, and it is in open communication with the transformer vessel 1, so that the conductors interconnecting the tappings of the transformer winding and the tap changer can extend directly there-between.

It will be obvious that the transformer vessel 1 and all compartments and spaces 3, 4, 7, 10 found in the tap changer vessel 2 are entirely filled with insulating liquid. Mounted on the bushing insulator 5 is an expansion tank 12 (conservator) which is in open communication with the compartment 4 through the tubular conductor 6.

The space 7 communicating with the compartment 3 through the aperture 8 is at its upper end connected to a second expansion tank 15 by a tube 13, in which a gas relay 14 is provided. The gas relay may also be mounted in the expansion tank 15.

For protection against explosion of the compartment 4 containing the change-over switching unit a pressure relay 16 is provided outside the metal vessel 2 of the tap changer, consequently on the earthed side. Said relay is hydraulically coupled with the mass of liquid contained in the compartment 4 through a conduit entirely filled with insulating liquid, of which a part is formed by a tube 17 of insulating material and a pressure box 18 in the form of a diaphragm or bellows, the arrangement being such, that only when in the compartment 4 a pressure impulse of predetermined or greater power is produced the pressure relay 16 and the safety device (not shown) connected therewith are put into operation. The danger of explosion of the compartment 4 may also be restricted by means of a large opening made in the wall of the said compartment, said opening being normally closed by a rupturing diaphragm 19 (shown in dotted lines). Before the wall of the compartment 4 is ruptured by an explosion occurring therein, the diaphragm 19 will break, so that the pressure in said compartment will be immediately reduced to a harmless value.

The described arrangement makes it possible to protect all compartments and spaces inside the tap changer vessel 2 well and to use a simple lead-in bushing insulator and direct connections between the transformer and the tap changer, even when the tap changer is connected on the network side of the transformer. In this connection it is observed that the space 10 is protected by the safety device of the transformer vessel. The tap changer is meant for very high voltages and it may also be used in combination with auto-transformers, e.g., auto-transformers for 750/380 kv.

Finally it will be apparent that the described arrangement is also suitable for a tap changer which is connected between the transformer and the star point.

What I claim is:

1. A transformer and a composite tap changer associated with said transformer and comprising a selector switching unit operating under zero-load conditions and a change-over switching unit operating under load conditions said combination of transformer and tap changer comprising a metal vessel containing the transformer, an adjacent metal vessel containing the tap changer, said vessels being filled with insulating liquid and forming a common metal envelope to be connected to earth, an inner container substantially made of insulating material and provided in the vessel containing the tap changer, said inner container being divided into compartments, one of said compartments containing the selector switching unit and an other one thereof containing the change-over switching unit, said compartments being separated from one another and from the transformer vessel in a liquid tight manner and being filled with insulating liquid, an end compartment spacing an end wall of the tap changer vessel from the near end wall forming part of the inner vessel and bounding the compartment containing the change-over switching unit, said end compartment being also filled with insulating liquid and being in open communication with the compartment containing the selector switching unit, a conduit connected to said end compartment and a gas relay provided in said conduit for the protection against a too strong evolution of gas in said end compartment and the compartment containing the selector switching unit, said end compartment extending also radially alongside the compartment containing the change-over switching unit.

2. A transformer and a composite tap changer associated with said transformer as claimed in claim 1, in which said end compartment extends also radially alongside a part of the selector switching unit compartment and terminal members are only provided on the wall of the part of the selector switching unit compartment, which projects from said end compartment into the tap changer vessel, said end compartment communicating directly with said selector switching unit compartment through an aperture made in the wall of the part of the selector switching unit compartment, which projects into the end compartment.

References Cited

UNITED STATES PATENTS

| | | | |
|---|---|---|---|
| 1,859,969 | 5/1932 | Jansson | 336—94X |
| 2,294,536 | 9/1942 | Bush | 336—94 |
| 2,294,712 | 9/1942 | Bolte | 336—94 |
| 2,553,291 | 5/1951 | Barr | 317—15X |
| 3,175,148 | 3/1965 | Swoish et al. | 336—94X |
| 3,229,023 | 1/1966 | Bolton et al. | 336—94X |

JAMES D. TRAMMELL, Primary Examiner

U.S. Cl. X.R.

317—15; 336—94